Sheet 1, 2 Sheets.

C. F. Hill.
Musical Instrument.

Nº 98,163.    Patented Dec. 21, 1869.

Witnesses.
C. Wahlers
E. F. Kastenhuber

Inventor:
Chas. F. Hill
per Van Santvoord & Hauff Attys

Sheet 2, 2 Sheets.
C. F. Hill.
Musical Instrument.
Nº 98,163.        Patented Dec. 21, 1869.
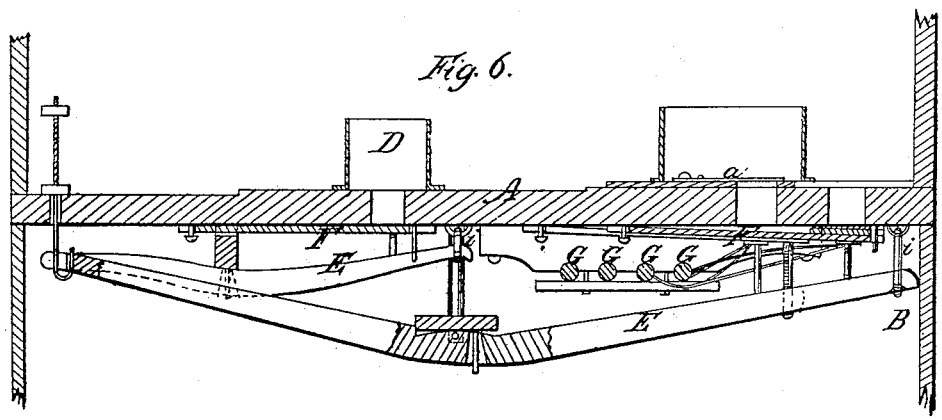
Fig. 6.
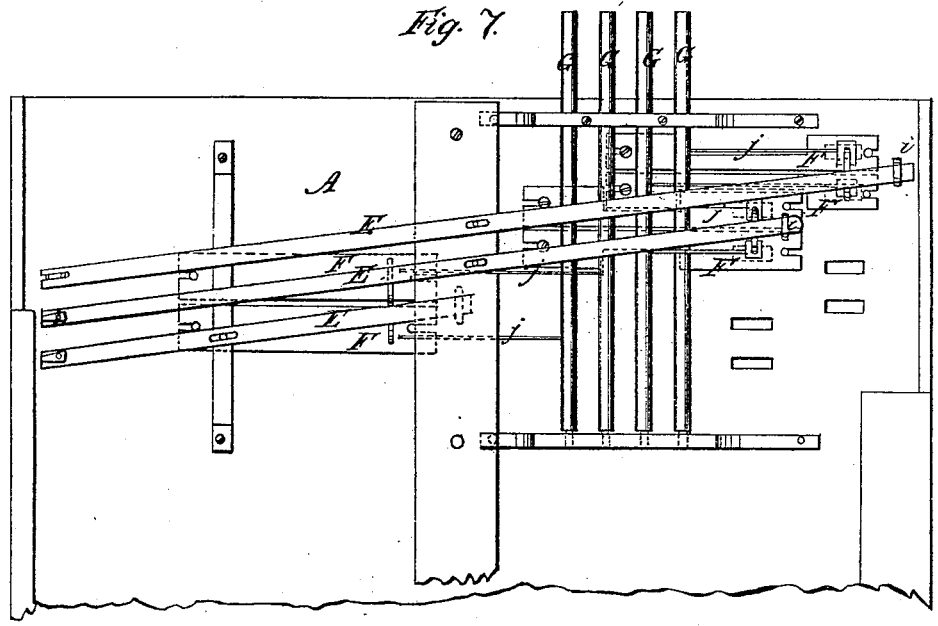
Fig. 7.
Fig. 8.
Witnesses.
C. Wahlers
E. F. Kastenhuber
Inventor.
Chas. F. Hill
per Van Santvoord & Hauff Attys

United States Patent Office.

CHARLES FREDERIC HILL, OF NEW YORK, N. Y.

Letters Patent No. 98,163, dated December 21, 1869.

---

IMPROVEMENT IN MUSICAL INSTRUMENTS.

---

The Schedule referred to in these Letters Patent and making part of the same.

---

*To all whom it may concern:*

Be it known that I, CHARLES FREDERIC HILL, of the city, county, and State of New York, have invented a new and useful Improvement in Musical Instruments; and I do hereby declare the following to be a full, clear, and exact description thereof, which will enable those skilled in the art to make and use the same, reference being had to the accompanying drawing, forming part of this specification, in which drawing—

Figure 1 represents a longitudinal vertical section of my invention, when the course of the wind is governed by the combination-slides.

Figures 2, 3, 4, and 5, are plan views of a combination-slide, in different positions and modifications.

Figure 6 is a longitudinal vertical section of my invention, when the course of the wind is governed by the combination-levers.

Figure 7 is an inverted plan of the same.

Figure 8 is a diagram, showing the position of the reeds in my instrument, when in three rows.

Similar letters indicate corresponding parts.

Figure 1:
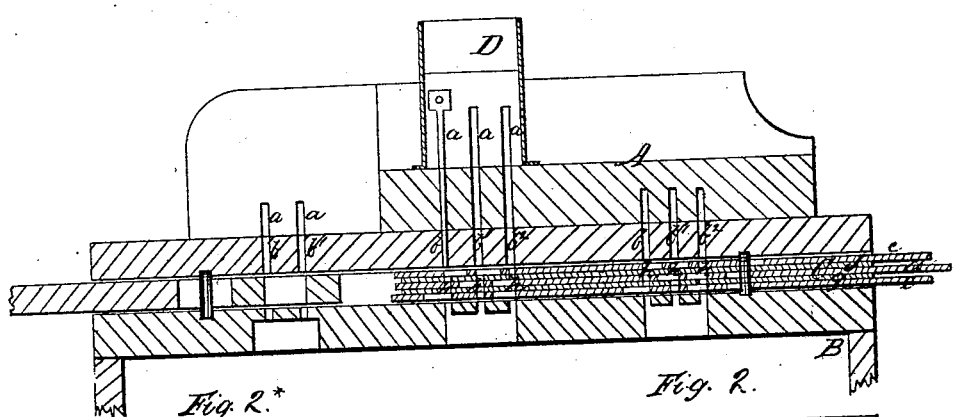

This invention consists in the arrangement of a combination-slide, in combination with two or more sets of reeds or pipes, in such a manner, that only one guide-way is required for two or more slides, and by adjusting said slides, the wind can be admitted to one or more sets of reeds or pipes simultaneously, or the wind can be cut off from all the reeds or pipes, and that two or more reeds can be used for each note, and controlled by one and the same slide, and thereby the construction and operation of a musical wind-instrument are materially simplified.

It consists, further, in the arrangement of levers in the interior of the wind-chest, each lever controlling the position of two or more valves for the admission of wind to the reeds, and connecting with one of the finger-keys of the instrument, in combination of the roller-stops, provided with arms, which can be made to bear on the wind-valves in such manner, that by adjusting said roller-stops, the number of valves governed by each lever and finger-key can be regulated at pleasure, and the operation of the instrument is simplified.

It consists, further, in the arrangement of pipes, each pipe covering two or more reeds, in such a manner, that by one and the same pipe the sound of two or more reeds is increased in volume, and thereby the number of pipes required, and consequently the cost of the instrument, are materially reduced.

In the drawing—

The letter A designates the reed-board, on which are secured the reeds $a$.

Each reed communicates, by a separate channel, $b$, with the wind-chest B, and the communication between these channels and the wind-chest can be opened or closed by a combination-slide, C.

In musical wind-instruments of the ordinary construction, each set of pipes is provided with its own slide, each slide moving in its separate guide-way, and connecting with its own stop, and the area of the wind-chest and of the sound-board must necessarily be expanded, to afford room for the several slides; and, furthermore, the reeds of each register, in ordinary reed-instruments, are placed so close together that it is not possible to introduce more than one reed to each note, or to apply pipes to the reeds.

My combination-slide is so constructed that it requires only one guide-way, and admits wind to two or more sets of reeds.

Said combination-slide, as shown in figs. 1, 2, 3, and 4, consists of three slides, $c$ $d$ $e$, which are separated from each other by two partitions, $f$ $g$.

Figure 2:
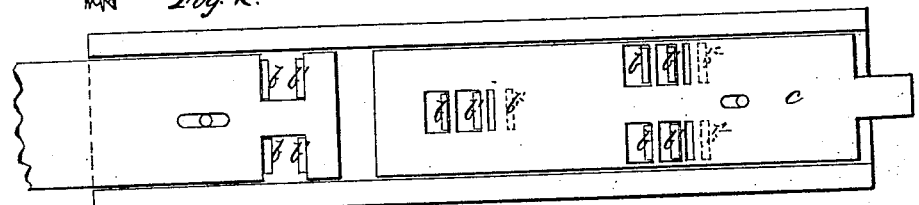
Figure 3:
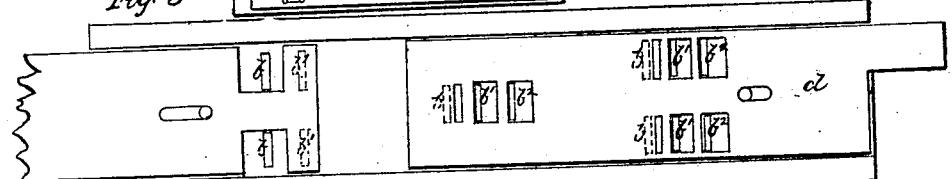
Figure 4:
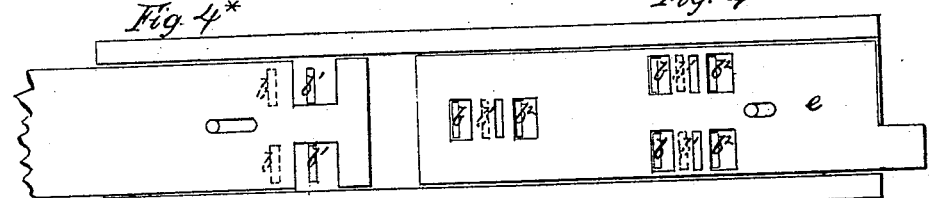

The partitions $f$ $g$ are perforated with channels or ports $h$, corresponding to the channels $b$, which lead to the reeds, but the slides $c$ $d$ $e$ are perforated with channels of different formation, as shown in figs. 2, 3, and 4, fig. 2 being a plan of the slide $c$; fig. 3, a plan of the slide $d$; and fig. 4, a plan of the slide $e$.

If the slide $c$ is drawn out, and the slides $d$ and $e$ are pushed in, all the channels $b$ $b^1$ $b^2$ are brought in communication with the wind-chest, and the wind is admitted to three sets of reeds.

By pushing in the slide $c$ to the position shown in fig. 2, the channels $b^2$ are cut off, and the wind is admitted only to the channels $b$ $b^1$; by pulling out the slide $d$ to the position shown in fig. 3, the channels $b$ are cut off, and wind is admitted to the channels $b^1$ $b^2$, (provided the slides $c$ and $e$ remain in the position shown in fig. 1;) and, finally, by pulling out the slide $e$ to the position shown in fig. 4, the chambers $b^1$ are cut off, and wind is admitted to the channels $b$ $b^2$.

If all the slides are brought to the position shown in figs. 2, 3, and 4, all the channels $b$ $b^1$ $b^2$ are cut off.

By arranging the slides $c$ $d$ $e$ one on the top of the others, only one guide-way is required, and the area of the wind-chest and of the reed-board can be reduced without reducing the number of stops.

Figure 5:
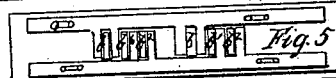

The form of the slides $c$ $d$ $e$ may, however, be modified, and said slides may be constructed in the form shown in figs. 2*, 3*, 4*, or they may be constructed in the form shown in fig. 5.

If desired, each of my slides $c$ $d$ $e$ may be constructed with two or more sets of ports, each set governing the admission of wind to a separate set of reeds, and an instrument can thus be constructed which has two reeds to a note, in the bars from the low $f$ for about twenty notes; ten notes above, three reeds to a note; and four reeds to a note in the upper treble, one slide being sufficient to control the admission of wind to the several sets of reeds.

The reeds of each register in my instrument are arranged in two or more rows, as indicated in the diagram, fig. 8, either on the surface of the reed-board or on the sides of the reed-bar, so that room is obtained for two or more reeds to each note, and for pipes each covering two or more reeds.

Slides for more than three reeds to a note will be made like the slide $e$.

By the peculiar arrangement of my combination-slide, as above described, and by arranging the reeds of each register in two or more rows, as indicated in the diagram, fig. 8, I am enabled to place the reeds on the reed-board so close together that one pipe, D, can be made to cover two or more reeds, and by the action of this one pipe the sound of all the reeds covered by said pipe is increased in volume and strength.

The object of bringing the reeds of different sets close together, so that two or more can be combined for one note, and covered by one and the same pipe, can also be effected by the means shown in figs. 6 and 7.

In these figures, I have shown levers E, which are situated in the interior of the wind-chest, each lever being made to act on two or more valves, F, which govern the admission of the wind to the reeds on the reed-board. Said levers E connect, by suitable mechanism, with the finger-keys of the instrument, so that by depressing one of the finger-keys, the lever or levers connected to it are caused to release their valves, and the wind is admitted to the several reeds governed by each lever.

In the drawing, each of the levers E retains two wind-valves, F, said levers being drawn up against these valves by India-rubber springs $i$. The instrument is supposed to act by suction, not by a blast, and if one of the levers is depressed, its valves open by their own gravity and by the suction, and the air passes through the reeds into the wind-chest, (which, in this case, would be more properly termed vacuum-chest,) and both reeds governed by the two valves sound simultaneously.

If it is desired to keep one set of wind-valves closed, and allow the other to open, a stop, G, is brought in operation. From this stop project arms $j$, which bear on those wind-valves that are to be kept closed, and by depressing the levers E, only those of the wind-valves are permitted to open which are not retained by the arms of the stops.

The pipes D which cover the reeds may either be placed over said reeds, as shown in fig. 6, or they may be cut open at their sides, and placed with that open side against the reeds, as shown in fig. 1.

What I claim as new, and desire to secure by Letters Patent, is—

1. The arrangement of two or more slides in one and the same guide-way, in combination with the channels $b$ $b^1$ $b^2$, forming the communication between the wind-chests and the reeds or pipes, substantially as shown and described.

2. The arrangement of two or more sets of ports, consisting of two or more openings in each slide, to control the admission of the wind to two or more reeds to each note, either separately or in combination, as set forth.

3. The arrangement of levers E in the wind-chest, to open communication with reeds, arranged in two or more lines or rows to a register, in combination with stops G, substantially as set forth.

4. The arrangement of valves F, so constructed that they open by suction and gravity, as set forth.

CHARLES FREDERIC HILL.

Witnesses:
  FRED. M. HILL,
  CHARLES W. HILL.